July 31, 1951         P. R. WHEELER         2,562,401
SNAP HOOK
Filed Nov. 4, 1946
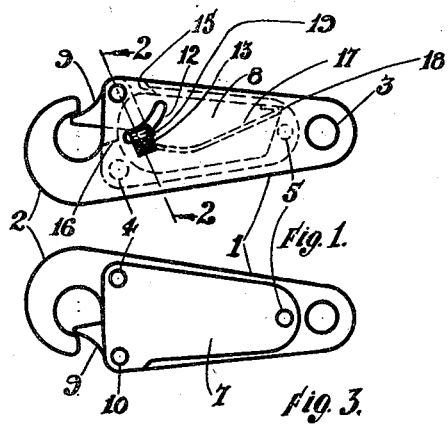
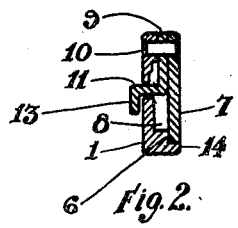
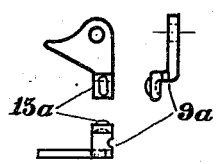
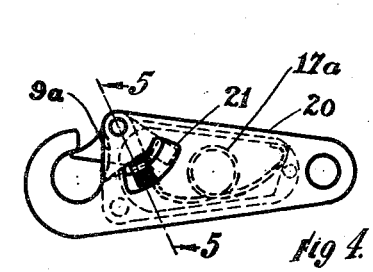
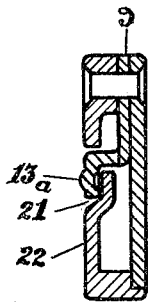
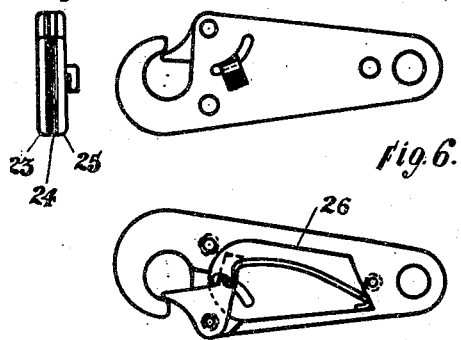
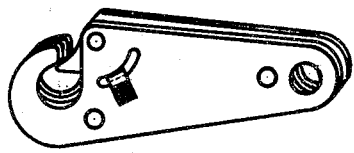
Phillip R. Wheeler Patented July 31, 1951

2,562,401

UNITED STATES PATENT OFFICE 2,562,401

SNAP HOOK

Phillip R. Wheeler, Alexandria, Va.

Application November 4, 1946, Serial No. 707,582

1 Claim. (Cl. 24—233)

The object of this invention is: To provide a snap that will be convenient to operate, economical to manufacture, light in weight, of attractive, smooth, and streamlined appearance, and one that will be secure when it is connected.

To provide a snap in which the catch withdraws completely from the hook recess.

To provide a snap suitable for all the uses of ordinary snap hook, such as dog chains, halter ropes, etc., and one which is also suitable for production in miniature sizes for jewelry uses such as watch chains, bracelets, necklaces, etc.

To provide a snap with a substantially flat oval body in which all round edges are provided for in the main body casting.

To provide a snap of laminated construction which can be made from stampings produced in a punch press.

To provide a snap of laminated construction in which both metal and plastic can be combined to provide a colorful attractive snap which will be strong and light.

To provide a snap hook in which the catch is a stamping and which may be completely recessed so as to avoid accidental release of the catch.

To provide a snap hook as described above in which the catch has a simple column type of spring and also one with a combined column and torsion spring giving a flat spring loading and extremely easy operation of the catch.

Fig. 1 shows a front side view of a new type of snap hook, showing the button for operating the snap catch and showing in dotted lines the recess for the spring.

Fig. 2 is a section on the line 2—2 of Fig. 1.

Fig. 3 is a back side view of the snap hook shown in Fig. 1.

Fig. 4 is a front side view of a modification of the snap hook shown in Fig. 1, in which the catch is recessed flush with the surface of the snap hook.

Fig. 5 is an enlarged section on the line 5—5 of Fig. 4.

Fig. 5a shows three views of a catch for the snap hook.

Fig. 6 shows a front view of a further modified snap hook with laminate construction instead of having a cast body.

Figure 6A shows an end view of Figure 6.

Fig. 7 is a perspective view of the snap hook shown in Fig. 6.

Fig. 8 is a backside view of the snap shown in Fig. 6, but with the back plate removed so as to show the recess in the center lamination, the catch and the spring.

Referring to Figs. 1, 2, and 3, a snap hook body is shown at 1. This body may be produced by die casting, investment casting or other suitable means. The body casting is adaptable for production in various materials, such as malleable iron, zinc, aluminum alloys or plastics. This body member has the hook 2 and the hole 3 for connecting to a chain, rope or other attachment. The body member has rivets 4 and 5 cast integral and extending from the surface of the plane at 6, through the cover plate 7. The recess 8 in the body member provides space for the spring and the latch piece 9.

The rivet 10 secures the latch piece between the body and the cover permitting it to pivot so as to swing clear of the opening in the hook. The latch piece 9 is offset as shown at 11 and extends through curved opening in the body member. The end 13 of the latch piece is bent over so as to lay close to the body member and to provide a convenient hold for the thumb or finger for operating the latch. The curved slot 12 is cut on a radius about the rivet center 10. All corners of the body member 1 are broken or rounded and the cover plate 7 fits flush with the surface 14. The body member is cut back as shown at 15 and 16 so as to provide space for the latch member to swing. The latch is indicated in the fully retracted position in Fig. 4.

The wire spring 17 has an end 18 pressing in the corner of the recess in the casting and a hook on the other end pressing into a notch cut in the latch piece. The spring 17a in Fig. 4 is constructed with an additional loop of wire to give a combined column and torsion spring of greater length and with a flatter load curve giving easier operation. The spring end rests in the notch 9a (Fig. 5a) of the latch piece. This notch is cut when the latch piece is punched out or may be cut on a broach, saw, or miller. The notch is shown at 9a in Fig. 5a. The notch holds the end of the wire in place against one side of the latch piece. Since the end of the wire has a reverse S bend in it, as viewed in Fig. 1, when the top of the S is slide into the notch it is held in place, permitting rapid and easy assembly. To complete the spring assembly it is merely necessary to push the other end of the spring into the end of the casting recess at 18. The spring then stays in place and the cover plate may be dropped on and riveted. A raised, rounded and smoothed thumb area is shown at 13A.

In assembly of the latch piece, the thumb operated tab which extends through to the outside is inserted through the curved slot and the latch dropped onto the rivet which has been inserted. Thus the complete assembly operation is simple and rapid.

This snap hook is intended for production in the light alloys, so as to provide an attractive, convenient and light weight snap, suitable for use on dog chains and leashes, for halters, harnesses or wherever a convenient, attractive, and strong snap is needed.

Figs. 4 and 5 show a modification of the snap hook shown in Figs. 1 to 3 in which the latch operating tab has been recessed in the side of the body member so as to make it completely free from accidental operation. All parts of this snap, except the body members are similar to the snap hook in Figures 1 to 3 and will not be further described. The body member 20 is slightly thicker, having a deeper internal recess so that the latch piece tab 13 rests in the recess 21 and has its top surface flush with the surface 22 of the face of the snap.

In Figs. 6, 7, and 8, views are shown of a snap hook similar to that in Figs. 1 to 3 except that the snap is constructed from punchings and has three rivets extending through all pieces. The three laminations are shown as 23, 24, and 25. The two outer laminations, i. e. 23 and 25 are identical except that 25 has the curved slot for the latch piece. The center lamination has the recess punched out as shown at 26, this recess being similar in shape to the recess in the snap hook of Figs. 1 to 3 when the cover plate is in place.

This type of construction permits the construction of all principal parts by punch press operation, one of the cheapest and best methods of production. It also permits the use of materials which have had their physical properties increased through rolling, an important factor in some kinds of material, particularly when using light alloys. In addition it permits the use of two materials as aluminum alloy and plastic which can further enhance the appearance and reduce weight and still provide a strong durable snap, particularly when the two outer laminations are metal and the inner is of plastic.

I claim:

In an article of manufacture, an elongated oval body member slightly larger at one end than at the other, a hook on the larger end of the body member, an opening between the hook end and the body member, a recess on one side of the body member, a cover plate for the recess, the said recess having a seat for the cover plate, holes in the cover plate, integral rivets in the body casting located to mate with the holes in the cover plate, a latch piece formed from a single piece of metal for normally closing the opening between the hook and the body member, a curved opening in the side of the body member, a bent over portion on the latch piece for extending through the curved opening, this bent over portion being at substantially right angles to the main portion of the latch piece, a second bent over portion of the latch piece lying close to the surface of the body member, this second bent over portion serving as a thumb piece for operating the latch, a pivot pin for the latch piece, a spring with one end engaging the first bent over portion of the latch piece adjacent the curved opening in the body member, the other end of the spring engaging the far corner of the recess, the said spring being like a slightly bent beam in compression, and a torsion loop inserted in the middle of the spring between the two ends.

PHILLIP R. WHEELER.

REFERENCES CITED

The following references are of record in the file of this patent:

UNITED STATES PATENTS

| Number | Name | Date |
|---|---|---|
| 648,429 | Peterson | May 1, 1900 |
| 865,224 | Applegate | Sept. 3, 1907 |
| 1,128,719 | Poppenhusen | Feb. 16, 1915 |
| 1,411,549 | Abbott | Apr. 4, 1922 |